Aug. 15, 1967     R. L. WHITE     3,336,503
DC CIRCUIT BREAKER WITH AUTOMATIC RESET
Filed Aug. 6, 1965
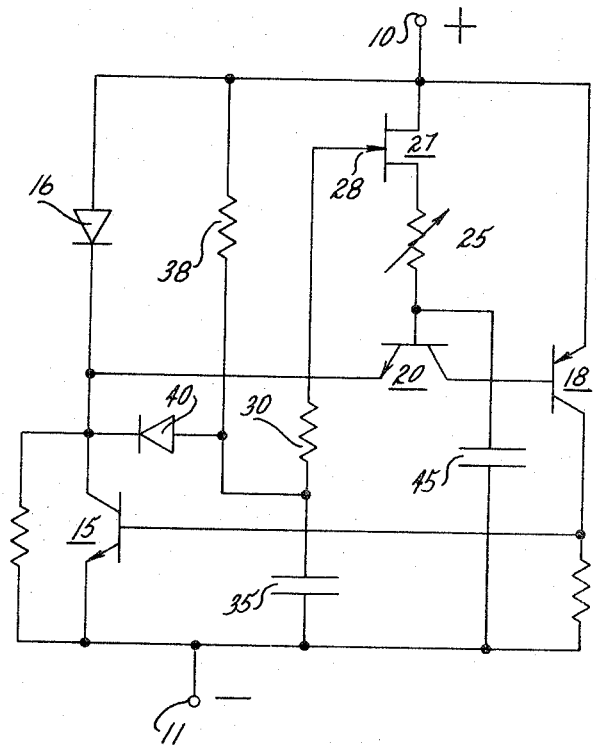
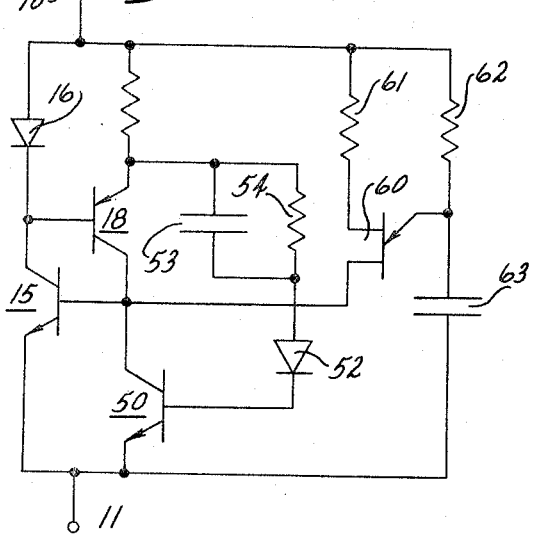
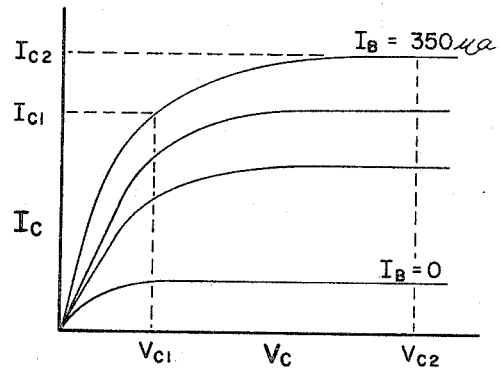
INVENTOR.
RICHARD L. WHITE
BY
ATTORNEYS

United States Patent Office 3,336,503
Patented Aug. 15, 1967

3,336,503
D.C. CIRCUIT BREAKER WITH AUTOMATIC RESET
Richard L. White, Paradise Valley, Ariz., assignor to Dickson Electronics Corporation
Filed Aug. 6, 1965, Ser. No. 477,734
11 Claims. (Cl. 317—22)

The present invention pertains to circuit breakers, and more specifically, to circuit breakers of the type having an automatic reset function wherein the circuit breaker is reclosed after opening.

The requirements for circuit breakers in high speed electronic equipment are many; such requirements as high speed, reliability, weight, bulk, cost, etc., are well-known. In providing all of the requirements, there nevertheless exists a unique requirement frequently resulting in cumbersome and bulky auxiliary equipment to be used in conjunction with a circuit breaker. This unique requirement is the requirement of a circuit breaker to reclose after a predetermined circuit condition has required the circuit breaker to open. Prior art attempts to provide automatic reclosing circuit breakers have resulted in generally unsatisfactory circuit breaker design when the circuit breaker is to be used with extremely sensitive equipment where a reclosing of normal circuit breaker operation would damage the equipment after a short circuit has caused the circuit breaker to open. In some instances, automatic reclosing is a concomitant of the application to which the circuit breaker is put; for example, in many instances, circuit breakers are used in conjunction with delicate communications equipment operating in an environment where electrical transients are prevalent. Such an application would be in mobile transmitting equipment where electric motors, spark discharges, etc., are likely to cause unwanted transients which might damage the communications equipment. A circuit breaker placed in such an environment would automatically open the circuit in response to the transient and thus prevent the communications equipment from becoming damaged. However, it is desirable to have the circuit breaker reclose at the end of the transient condition without the requirement of manual intervention. The problem then arises of differentiating between a transient circuit condition causing a circuit breaker to open and a continuing condition wherein a reclosing of the circuit breaker would result in damaging current flow to the equipment.

It is therefore an object of the present invention to provide a reliable and compact circuit breaker that will automatically reclose after a predetermined time subsequent to a condition causing its opening.

Another object of the present invention is to provide a circuit breaker that will open upon the occurrence of a short circuit current existing in a load attached thereto and will automatically attempt to reclose but will not reclose in those instances where the short circuit condition subsists.

It is still another object of the present invention to provide a circuit breaker that, after opening upon a sensing of an opening condition, will reclose and then reopen if the condition causing the first opening still exists.

Other objects and advantages of the present invention will become apparent to those skilled in the art as the description thereof proceeds.

Briefly, in accordance with one embodiment of the present invention, a circuit breaker is provided including a pair of complementary transistors connected base-to-collector to provide a feedback conducting path. Another transistor is placed in a manner to provide a means for interrupting the current flowing between the first two transistors and for clamping the first two transistors in a non-conducting state. The base electrode of the thus controlling transistor is connected to a capacitor charging circuit that, when charged during an open condition, will gate the first two transistors to the conducting condition. If the short circut in the connected load has been removed by the time that the circuit breaker has been reclosed, the circuit condition will continue as it originally existed; however, if the short in the load causing the original opening of the circuit breaker subsists, the circuit breaker will immediately reopen. The period of the attempted reclosing of the circuit breaker is extremely short and will not deleteriously affect the load even though the short in the load remains.

The present invention may more readily be described by reference to the accompanying drawings in which:

FIGURE 1 is a simplified schematic circuit diagram of a circuit breaker incorporating the teachings of the present invention.

FIGURE 2 is another simplified schematic circuit diagram showing a different embodiment of the present invention.

FIGURE 3 is an idealized set of curves representing selected transistor characteristics useful in describing the operation of the circuit of FIGURE 2.

Referring to FIGURE 1, the schematic circuit diagram shown therein includes a pair of terminals 10 and 11 which may be used to connect to a power source (not shown) and a load (not shown) respectively. A first transistor 15 includes a collector electrode connected to the cathode electrode of a diode 16. The anode electrode of the diode 16 is connected to the terminal 10. The emitter electrode of the transistor 15 is connected to the terminal 11 and the base electrode thereof is connected to a collector electrode of a complementary transistor 18. Transistor 18 is connected through its emitter electrode to the terminal 10 and through its base electrode and the collector-emitter circuit of the transistor 20 to the collector electrode of the transistor 15. The base electrode of the transistor 20 is connected through a variable resistance 25 and through the drain-source circuit of a field-effect transistor 27 to the terminal 10. The field-effect transistor 27 includes a gate electrode 28 connected through resistor 30 and a capacitor 35 to the terminal 11. A capacitor charging circuit is provided from the terminal 10 by the resistor 38 connected to the junction between the resistor 30 and the capacitor 35. A capacitor discharge path is provided by the diode 40 connected through its anode electrode to the capacitor 35 and its cathode electrode to the collector electrode of the transistor 15. A capacitor 45, connected between the terminal 11 and the base electrode of the transistor 20 provides a low impedance path for transients occurring at the terminal 11 as will become more apparent hereinafter.

The operation of the circuit of FIGURE 1 may be described as follows. It will be assumed that the terminal 10 is connected to a suitable power source and that the terminal 11 is connected to a load. When the circuit breaker is in its closed position, current flows through the diode 16 and the collector-emitter circuit of the transistor 15. Current also flows through the base circuit of the transistor 18, through the collector-emitter circuit of the transistor 20 to the collector of transistor 15. The closed circuit impedance imposed by the circuit breaker is thus extremely low and is essentially a short circuit. When a short circuit appears in the load connected to the terminal 11, a transient is produced that is transmitted through the capacitor 45 to the base electrode of the transistor 20. Transistor 20 thus begins to turn off resulting in reduced current to the transistor 15 which in turn results in reduced bias to the transistor 18 which again reduces the current flowing in transistor 20. The resulting regenerative action quickly opens the circuit breaker and isolates the source applied to terminal 10 from the load connected to terminal 11.

The field-effect transistor 27 clamps the circuit breaker in the open condition. When the circuit breaker is open, the voltage between the terminals 10 and 11 is impressed across the capacitor charging circuit comprising resistor 38 and capacitor 35. The charge on the capacitor 35 increases to the point that the bias provided to the gate electrode 28 of the field-effect transistor 27 causes the latter to conduct and supply current to the base of transistor 20. A reverse regenerative action occurs closing the circuit breaker and once again applying source potential to the load circuit. The capacitor 35 discharges through the diode 40 and the emitter-collector circuit of the transistor 15. If the load continues to be short-circuited, the circuit breaker immediately reopens in the manner described previously in connection with its initial opening. The time involved during the reclosing of the circuit breaker, and the total energy flowing to the load is extremely small. In one commercial embodiment, the time that the circuit breaker was reclosed prior to its reopening was a matter of only a few microseconds.

Referring to FIGURE 2, another embodiment of the present invention is shown. The elements of FIGURE 2 corresponding to like elements of FIGURE 1 are indicated by identical numerals. A transistor 50 is connected with its emitter-collector circuit between the collector electrode of transistor 18 and the terminal 11. The base electrode of transistor 50 is connected through a diode 52 and a parallel combination of a capacitor 53 and a resistor 54 to the emitter electrode of transistor 18. A relaxation oscillator is provided and, in the specific embodiment shown in FIGURE 2, comprises a unijunction transistor 60 connected to resistors 61 and 62 and the capacitor 63. The operation of the circuit of FIGURE 2 may be described as follows. With the terminal 10 connected to a suitable power source, and the terminal 11 connected to the load to be protected, the circuit breaker in the closed condition operates in a manner identical to that described above. When a short circuit occurs in the load, the resulting transient is transmitted through the base emitter circuit of the transistor 50, through the diode 52 and capacitor 53. The current thus flowing results in a reduced current through the emitter of transistor 18 and, coupled with the resulting reduced bias on the base electrode of the transistor 15 results in a regenerative action to open the circuit. When the circuit has opened, the continued flow of current through the resistor 54, diode 52, and base-to-emitter junction of the transistor 50 clamps transistor 15 in its open state, thus insuring that the circuit breaker remains open. When the circuit breaker has opened, the potential existing between the terminals 10 and 11 results in a suitable bias potential applied to the previously mentioned relaxation oscillator. In accordance with normal oscillating theories, the capacitor 63 charges through the resistor 62 until a predetermined discharge point is reached and the capacitor discharges through the unijunction transistor 60 to the collector electrode of the transistor 50. To more fully understand the effect of this discharge current, reference will be made to FIGURE 3. FIGURE 3 represents idealized typical collector current versus collector voltage characteristics of a transistor having various base currents flowing therethrough. If we assume that the base current of transistor 50 is 350 microamps represented by the upper curve of FIGURE 3, and a collector current of $I_{c1}$, the voltage at the collector will be represented by $V_{c1}$. When the capacitor discharges to the collector, the collector current will be increased to $I_{c2}$; it may be seen that because of the shape of the curve, the increase in the voltage at the collector to $V_{c2}$ will be disproportionate and a greater portion of the current will be shunted to the base electrode of transistor 15. The current thus provided to the base electrode of transistor 15 instigates the regenerative action described previously to cause the circuit breaker to turn on or close. If the short circuit in the load subsists, the circuit breaker will again open and the resulting potential between the terminals 10 and 11 will result in oscillation of the relaxation oscillator to once again charge and discharge the capacitor 63 as described previously.

It may therefore be seen by those skilled in the art that the utilization of the increased potential across the terminals of the circuit breaker to charge and discharge a capacitor in a manner to gate the circuit breaker to the closed condition results in an automatic reclosing circuit breaker which, if designed to reopen in a short enough period of time, will effectively "sample" the condition of the load and will continue to present an open circuit between the load and the power source until the short in the load is remedied. It will also be obvious to those skilled in the art that many modifications may be made in the circuit shown and described herein without departing from the spirit and scope of the invention. For example, it may be possible to utilize a zener diode connected between the low voltage side of the load to the base electrode of the transistor 15 to provide voltage sensitivity and thus result in an opening of the circuit breaker in the event of an overvoltage. The automatic reclosing feature of the present invention would still obtain and the circuit breaker would attempt to reclose as described previously. Reference herein to a load short circuit will be recognized by those skilled in the art to mean any preselected tripping current regardless of cause.

I claim:
1. An automatic resetting circuit breaker comprising: a pair of complementary transistors connected in a feedback arrangement with base electrodes of each connected to collector electrodes of the other; means connecting the collector electrode of the first of said transistors to a first terminal through a diode; means connecting the emitter electrode of the second of said transistors to said first terminal; means connecting the emitter electrode of the first transistor and the collector electrode of the second transistor to a second terminal; a controllable current-conducting element, including a control electrode, connected in series in the current path between the base electrode of the second transistor and collector electrode of the first transistor; a charge accumulating element connected between said first and second terminals responsive to the voltage therebetween for storing a charge; and means connecting said charge accumulating element to the control electrode of said controllable current-conducting element.

2. An automatic resetting circuit breaker comprising: a pair of complementary transistors connected in a feedback arrangement with base electrodes of each connected to collector electrodes of the other; means connecting the collector electrode of the first of said transistors to a first terminal through a diode; means connecting the emitter electrode of the second of said transistors to said first terminal; means connecting the emitter electrode of the first transistor and the collector electrode of the second transistor to a second terminal; a controllable current-conducting element, including a control electrode, connected in series in the current path between the base electrode of the second transistor and collector electrode of the first transistor; a charge accumulating element connected between said first and second terminals responsive to the voltage therebetween for storing a charge; means connecting said charge accumulating element to the control electrode of said controllable current-conducting element; and means including a diode connecting said charge accumulating element to the collector electrode of said first transistor for discharging said accumulating element when said first transistor conducts.

3. An automatic resetting circuit breaker comprising: a first and a second terminal; a unidirectional conducting device having first and second electrodes, said first electrode connected to said first terminal; a first transistor having a collector electrode connected to the second electrode of said unidirectional conducting device, an emitter electrode connected to said second terminal, and a base electrode; a second transistor having an emitter electrode connected to said first terminal, a collector electrode connected to said second terminal, and a base electrode; means connecting the base electrode of said first transistor to the collector electrode of said second transistor; a third transistor having an emitter electrode connected to collector electrode of said first transistor, a collector electrode connected to the base electrode of said second transistor, and a base electrode; means including a resistor connecting the base electrode of said third transistor to said first terminal; a charge accumulating element connected between said first and second terminals responsive to the voltage therebetween for storing a charge; and means connecting said charge accumulating element to the base electrode of said third transistor.

4. An automatic resetting circuit breaker comprising: a first and a second terminal; a unidirectional conducting device having first and second electrodes, said first electrode connected to said first terminal; a first transistor having a collector electrode connected to the second electrode of said unidirectional conducting device, an emitter electrode connected to said second terminal, and a base electrode; a second transistor having an emitter electrode connected to said first terminal, a collector electrode connected to said second terminal, and a base electrode; means connecting the base electrode of said first transistor to the collector electrode of said second transistor; a third transistor having an emitter electrode connected to collector electrode of said first transistor, a collector electrode connected to the base electrode of said second transistor, and a base electrode; means including a resistor connecting the base electrode of said third transistor to said first terminal; a charge accumulating element connected between said first and second terminals responsive to the voltage therebetween for storing a charge; means connecting said charge accumulating element to the base electrode of said third transistor; and means including a diode connecting said charge accumulating element to the collector electrode of said first transistor for discharging said accumulating element when said first transistor conducts.

5. An automatic resetting circuit breaker comprising: a pair of complementary transistors connected in a feedback arrangement with base electrodes of each connected to collector electrodes of the other; means connecting the collector electrode of the first of said transistors to a first terminal through a diode; means connecting the emitter electrode of the second of said transistors to said first terminal; means connecting the emitter electrode of the first transistor and the collector electrode of the second transistor to a second terminal; a third transistor having a collector electrode connected to the base electrode of said first transistor, an emitter electrode connected to said second terminal, and a base electrode connected to the emitter electrode of said second transistor; and capacitor charging and discharging means comprising an oscillator connected between said first and second terminals, and having a capacitor discharge circuit including the base to emitter junction of said first transistor and the collector-emitter circuit of said third transistor.

6. An automatic resetting circuit breaker comprising: a pair of complementary transistors connected in a feedback arrangement with base electrodes of each connected to collector electrodes of the other; means connecting the collector electrode of the first of said transistors to a first terminal through a diode; means connecting the emitter electrode of the second of said transistors to said first terminal; means connecting the emitter electrode of the first transistor and the collector electrode of the second transistor to a second terminal; a third transistor having a collector electrode connected to the base electrode of said first transistor, an emitter electrode connected to said second terminal, and a base electrode connected through a diode and a capacitor to the emitter electrode of said second transistor; and capacitor charging and discharging means comprising an oscillator connected between said first and second terminals, and having a capacitor discharge circuit including the base to emitter junction of said first transistor and the collector-emitter circuit of said third transistor.

7. An automatic resetting circuit breaker comprising: a first and a second terminal; a unidirectional conducting device having first and second electrodes, said first electrode connected to said first terminal; a first transistor having a collector electrode connected to the second electrode of said unidirectional conducting device, an emitter electrode connected to said second terminal, and a base electrode; a second transistor having an emitter electrode connected to said first terminal, a collector electrode connected to said second terminal, and a base electrode; means connecting the base electrode of said first transistor to the collector electrode of said second transistor; a third transistor having a collector electrode connected to the base electrode of said first transistor, an emitter electrode connected to said second terminal, and a base electrode connected to the emitter electrode of said second transistor; and capacitor charging and discharging means comprising an oscillator connected between said first and second terminals, and having a capacitor discharge circuit including the base to emitter junction of said first transistor and the collector-emitter circuit of said third transistor.

8. An automatic resetting circuit breaker comprising: a first and a second terminal; a unidirectional conducting device having first and second electrodes, said first electrode connected to said first terminal; a first transistor having a collector electrode connected to the second electrode of said unidirectional conducting device, an emitter electrode connected to said second terminal, and a base electrode; a second transistor having an emitter electrode connected to said first terminal, a collector electrode connected to said second terminal, and a base electrode; means connecting the base electrode of said first transistor to the collector electrode of said second transistor; a third transistor having a collector electrode connected to the base electrode of said first transistor, an emitter electrode connected to said second terminal, and a base electrode connected through a diode and a capacitor to the emitter electrode of said second transistor; and capacitor charging and discharging means comprising an oscillator connected between said first and second terminals, and having a capacitor discharge circuit including the base to emitter junction of said first transistor and the collector-emitter circuit of said third transistor.

9. An automatic resetting circuit breaker comprising: a first and a second terminal; a unidirectional conducting device having first and second electrodes, said first electrode connected to said first terminal; a first transistor having a collector electrode connected to the second electrode of said unidirectional conducting device, an emitter electrode connected to said second terminal, and a base electrode; a second transistor having an emitter electrode connected to said first terminal, a collector electrode connected to said second terminal, and a base electrode; means connecting the base electrode of said first transistor to the collector electrode of said second transistor; a third transistor having an emitter electrode connected to collector electrode of said first transistor, a collector electrode connected to the base electrode of said second transistor, and a base electrode; a field effect transistor having a source electrode connected to said first terminal, a drain electrode connected to the base electrode of said third transistor, and a gate electrode; a capacitor having a first electrode connected to said gate electrode and a second electrode connected to said second terminal; a second unidirectional conducting device connected between the first electrode of said capacitor and the collector electrode of said first transistor; and a resistor connected between said first terminal and the first electrode of said capacitor.

10. An automatic resetting circuit breaker comprising: a first and a second terminal; a unidirectional conducting device having first and second electrodes, said first electrode connected to said first terminal; a first active circuit element having a current path between first and second electrodes thereof, and having a control electrode, the first electrode thereof connected to the second electrode of said unidirectional conducting device, and the second electrode thereof connected to said second terminal; a second active circuit element having a current path between first and second electrodes thereof, and having a control electrode, the second electrode thereof connected to said first terminal, and the first electrode thereof connected to said second terminal; means connecting the control electrode of said first active circuit element to the first electrode of said second active circuit element; a third active circuit element having a current path between first and second electrodes thereof, and having a control electrode, the second electrode thereof connected to the first electrode of said first active circuit element, and the first electrode thereof connected to the control electrode of said second active circuit element; a field effect transistor having a source electrode connected to said first terminal, a drain electrode connected to the control electrode of said third active circuit element, and a gate electrode; a capacitor having a first electrode connected to said gate electrode and a second electrode connected to said second terminal; a second unidirectional conducting device connected between the first electrode of said capacitor and the first electrode of said first active circuit element; and a resistor connected between said first terminal and the first electrode of said capacitor.

11. An automatic resetting circuit breaker comprising: a pair of complementary transistors connected to a feedback arrangement with base electrodes of each connected to collector electrodes of the other; means connecting the collector electrode of the first of said transistors to a first terminal through a diode; means connecting the emitter electrode of the second of said transistors to said first terminal; means connecting the emitter electrode of the first transistor and the collector electrode of the second transistor to a second terminal; a controllable current-conducting element, including a control electrode, connected in series in the current path between the base electrode of the second transistor and collector electrode of the first transistor; and a field effect transistor having a source electrode connected to said first terminal, a drain electrode connected to said control electrode, and a gate electrode connected through a resistor and a capacitor to said second terminal; a diode connected to the resistor side of said capacitor and to the collector electrode of the first transistor, and a resistor connected between said first terminal and the capacitor side of said diode.

References Cited
UNITED STATES PATENTS

| | | | |
|---|---|---|---|
| 3,109,980 | 11/1963 | Wiley | 317—22 X |
| 3,122,697 | 2/1964 | Kanders | 317—22 X |
| 3,147,400 | 9/1964 | McClay | 317—22 |
| 3,235,787 | 2/1966 | Gordon et al. | 317—22 X |

MILTON O. HIRSHFIELD, *Primary Examiner.*

J. D. TRAMMELL, *Assistant Examiner.*